(No Model.)
A. A. BROOKS.
CAR TRUCK.
No. 508,276. Patented Nov. 7, 1893.
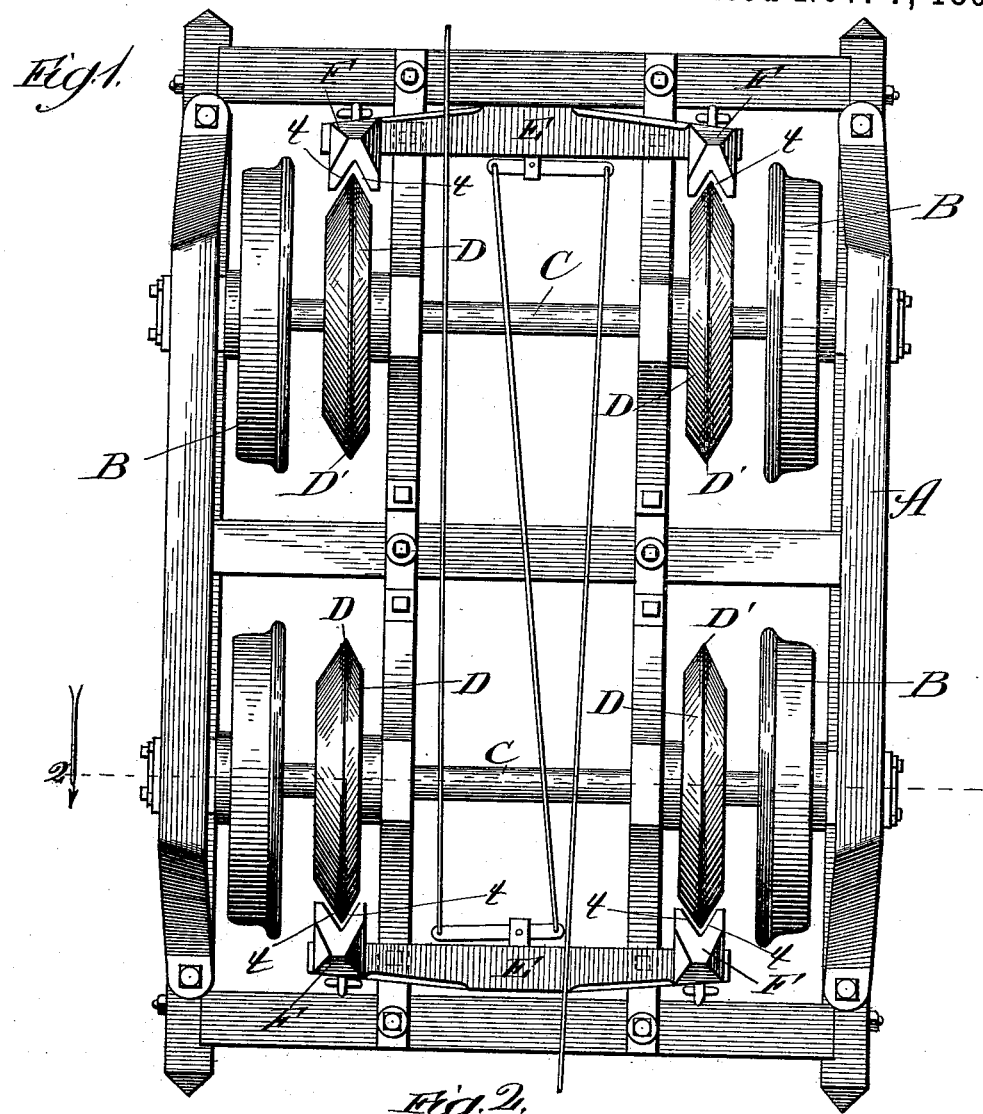
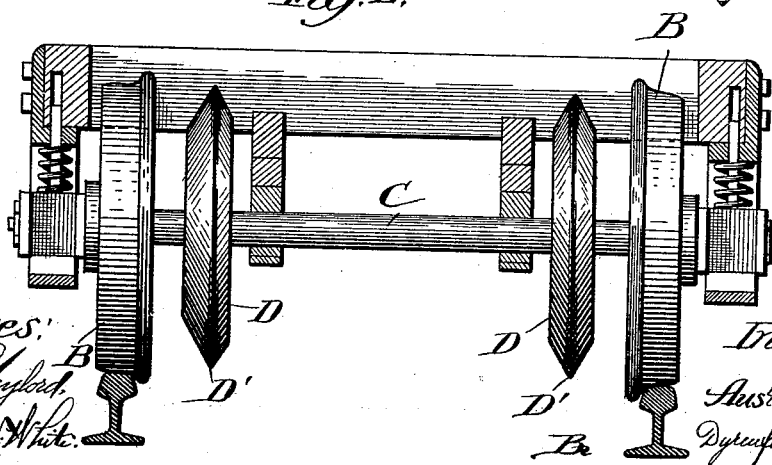
Witnesses:
Inventor:
Austin A. Brooks,

UNITED STATES PATENT OFFICE.

AUSTIN A. BROOKS, OF EAU CLAIRE, ASSIGNOR TO THE BROOKS SAFETY TRUCK COMPANY, OF CHIPPEWA FALLS, WISCONSIN.

CAR-TRUCK.

SPECIFICATION forming part of Letters Patent No. 508,276, dated November 7, 1893.

Application filed January 21, 1893. Serial No. 459,098. (No model.)

*To all whom it may concern:*

Be it known that I, AUSTIN A. BROOKS, a citizen of the United States, residing at Eau Claire, in the county of Eau Claire and State of Wisconsin, have invented a new and useful Improvement in Car-Trucks, of which the following is a specification.

My invention relates to an improvement in car trucks.

In Letters-Patent of the United States No. 278,495, granted to me May 29, 1883, I show and describe an improvement in car trucks which involves the placing of guard wheels upon the axles of the tread wheels, and in such relation to the latter that in case the tread wheels shall be thrown from the track, their guard wheels shall operate to hold the car in place, and prevent its being removed from the line. The structure there shown is operative to its fullest extent, but I have improved the structure by improving the form of the guard wheel, and in connection with this change in the form of the wheel, I have utilized it as a medium for applying the brakes to the wheels whereby the wear upon the surface or tread portion of the car wheels is prevented. By utilizing the guard wheels as a medium for applying the brakes to the tread wheel I am enabled also materially to shorten the length of the brake beam, which gives not merely a saving in cost of construction, but results in a very much firmer application of braking power from the same brake moving source with a materially reduced strain upon the beam itself, the life or durability of which is hence greatly prolonged.

My invention consists in the general improvements above outlined, and also in the general and specific details of construction and combination of parts, all as hereinafter more fully set forth.

In the drawings—Figure 1 is a plan view of a brake constructed in accordance with my improvement; and Fig. 2 is a cross section thereof on the line 2 of Fig. 1.

A represents the side frames of the truck, in which are mounted as usual the wheels B on axles C. Upon each axle C, adjacent to the tread wheel B, there is mounted a guard wheel D of substantially the same diameter as the tread portion of the tread wheel, but having its opposite faces beveled at the edge to produce the annular wedge D'. The point of the wedge is substantially central with the thickness of the wheel, but the opposite faces are inclined at different angles, the side adjacent to the tread wheels having a sharper pitch than the other side. The purpose of this arrangement is to produce a more satisfactory engagement between the guard wheel and the rail when the latter comes into use by reason of the tread wheel leaving the rail. The wedge shaped edges of the guard wheels have, however, a further function in connection with the form of brake shoe presently described.

Extending transversely of the truck, and adjacent to each guard wheel D, are brake beams E, which are of the usual construction except that instead of extending from tread wheel to tread wheel they are materially shortened in length. It follows that their strength and durability are materially increased, and their initial cost materially reduced. Each brake beam carries as usual toward its opposite extremities a brake shoe F, properly mounted in a hanger suitable to the brake beam, the brake shoe F being angular in its bearing surface by having the internally converging sides *t*, as clearly shown in Fig. 1. The nature of the inclination of the bearing face of the brake shoe is such as substantially to correspond with the wedge form of the edge of the guard wheel, and its location is such that when moved forward by the brake beam it will engage and grip the guard wheels, and apply a frictional power very much greater than it is possible to obtain with the form of brake shoe now in common use which engages merely the tread portion of the tread wheel. It is quite obvious that by applying the friction for braking purposes to the guard wheel the injurious wear upon the tread wheel itself is avoided, effecting a saving of from thirty to fifty per cent., it is estimated, in the durability of the tread wheels.

Any desired form of brake applying mechanism may be used in connection with the present improvement, and although it is illustrated in the drawings as associated with a hand brake, it will be understood that any other species of power may be substituted.

What I claim as new, and desire to secure by Letters Patent, is—

In combination with a car truck, and the tread wheels and axles thereon, the guard wheels D having the wedge shaped periphery D', one side of which has a sharper inclination than the other, substantially as described.

AUSTIN A. BROOKS.

In presence of—
M. J. FROST.
B. M. TAUSIG,